(12) United States Patent
Ledet

(10) Patent No.: US 10,554,589 B1
(45) Date of Patent: Feb. 4, 2020

(54) MESSAGE MANAGEMENT AND CONVERSATION PROCESSING APPLICATION

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 405 days.

(21) Appl. No.: 14/813,965

(22) Filed: Jul. 30, 2015

(51) Int. Cl.
*G06F 15/16* (2006.01)
*H04L 12/58* (2006.01)

(52) U.S. Cl.
CPC .............. *H04L 51/02* (2013.01); *H04L 51/04* (2013.01)

(58) Field of Classification Search
CPC ................................ H04L 51/02; H04L 51/04
USPC ......................................................... 709/206
See application file for complete search history.

(56) References Cited

U.S. PATENT DOCUMENTS

| | | | | |
|---|---|---|---|---|
| 8,135,413 | B2* | 3/2012 | Dupray | H04W 4/029 455/456.1 |
| 8,386,340 | B1* | 2/2013 | Feinstein | G06Q 30/02 705/27.1 |
| 8,943,128 | B2* | 1/2015 | Fortier | G06Q 10/10 709/204 |
| 9,876,693 | B1* | 1/2018 | Davidson | H04L 43/08 |
| 2013/0080427 | A1* | 3/2013 | Cross | G06Q 30/0224 707/728 |
| 2014/0019443 | A1* | 1/2014 | Golshan | G06F 17/30867 707/723 |

* cited by examiner

*Primary Examiner* — Sm A Rahman

(57) ABSTRACT

Identifying user input data on a mobile user device may provide a way to predict the types of questions and actions a user will take and offer information contemporaneously with such actions. One example method of operation includes identifying a computer hosted conversation with at least one user submitting conversational statements, parsing the conversational statements to identify at least one item of interest, retrieving a source of information corresponding to the item of interest and automatically creating a response statement including the item of interest.

15 Claims, 13 Drawing Sheets

MESSAGE MANAGEMENT AND CONVERSATION PROCESSING APPLICATION

TECHNICAL FIELD OF THE APPLICATION

This application relates to information management and customization and more particularly to incorporating user's interests with other users to enhance messaging and conversations transactions to prepare future information processing operations.

BACKGROUND OF THE APPLICATION

Software defined networking (SDN) is an approach to computer networking that permits network administrators to manage network services through the abstraction of lower level functionality. For example, this abstraction is accomplished by decoupling the functionality that would normally make decisions about where traffic is sent (i.e., the control plane) from the underlying layers that forward traffic to the selected destination (i.e., the data plane).

In one example, when a packet arrives at a conventional networking switch, predefined rules instruct the switch where to forward the packet. In general, every packet may be sent to the same destination and along the same path thus treating all similar packets in the same manner. However, the goal of SDN is to enable network engineers and administrators with the ability to shape traffic from a centralized control console without having to interact with the individual switches. The shaping of traffic includes prioritizing, de-prioritizing and blocking specific types of packets at a granular level of control.

SDN implementations are emerging architectures that offer dynamic, manageable, cost-effective, and adaptable approaches for the high-bandwidth, dynamic nature of today's applications. SDN architectures decouple network control and forwarding functions, enabling network control to become directly programmable and the underlying infrastructure to be abstracted from applications and network services.

SUMMARY OF THE APPLICATION

One example embodiment may provide a method that includes a at least one of identifying a computer hosted conversation with at least one user submitting conversational statements, parsing the conversational statements to identify at least one item of interest, retrieving at least one source of information corresponding to the at least one item of interest when the at least one source of information is identified to be valid, and automatically creating at least one response statement comprising the at least one item of interest.

Another example embodiment may include an apparatus that includes a processor configured to perform at least one of identify a computer hosted conversation with at least one user submitting conversational statements, parse the conversational statements to identify at least one item of interest, and a transmitter configured to transmit a retrieve request to retrieve at least one source of information corresponding to the at least one item of interest when the at least one source of information is identified to be valid, and the processor automatically creates at least one response statement comprising the at least one item of interest.

Another example embodiment may provide non-transitory computer readable storage medium configured to store instructions that when executed cause a processor to perform at least one of identifying a computer hosted conversation with at least one user submitting conversational statements, parsing the conversational statements to identify at least one item of interest, retrieving at least one source of information corresponding to the at least one item of interest when the at least one source of information is identified to be valid, and automatically creating at least one response statement comprising the at least one item of interest.

Yet another example embodiment includes a method that provides at least one of identifying a computer hosted conversation with a plurality of users submitting conversational statements, parsing the conversational statements to identify at least one item of interest, determining whether the at least one item of interest is a new item different from previously stored messages, automatically creating at least one response statement message including third party information corresponding to the at least one item of interest, and transmitting the response statement message to each of the plurality of users.

Yet still another example embodiment may include an apparatus that provides a processor configured to perform at least one of identify a computer hosted conversation with a plurality of users submitting conversational statements, parse the conversational statements to identify at least one item of interest, and determine whether the at least one item of interest is a new item different from previously stored messages, and automatically create at least one response statement message comprising third party information corresponding to the at least one item of interest, and a transmitter configured to transmit the response statement message to each of the plurality of users.

Yet still a further embodiment provides a non-transitory computer readable storage medium configured to store instructions that when executed cause a processor to perform identifying a computer hosted conversation with a plurality of users submitting conversational statements, parsing the conversational statements to identify at least one item of interest, determining whether the at least one item of interest is a new item different from previously stored messages, automatically creating at least one response statement message comprising third party information corresponding to the at least one item of interest, and transmitting the response statement message to each of the plurality of users.

DETAILED DESCRIPTION OF THE APPLICATION

Figure 1:
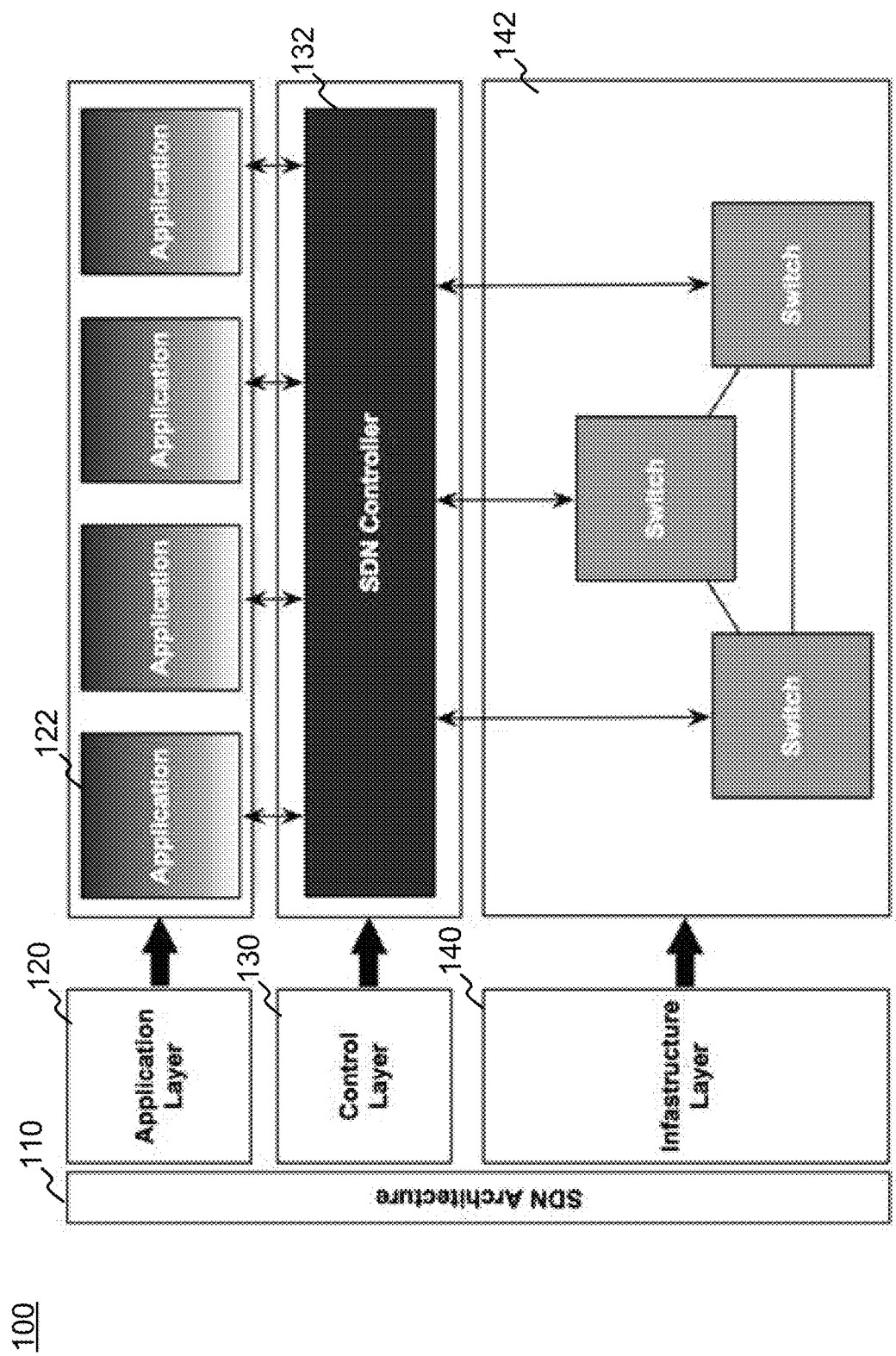
FIG. 1 illustrates a SDN system architecture diagram according to an example embodiment of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

It will be readily understood that the components of the present application, as generally described and illustrated in the FIG.s herein, may be arranged and designed in a wide variety of different configurations. Thus, the following detailed description of the embodiments of a method, apparatus, and system, as represented in the attached FIG.s, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments of the present application provide an application that utilizes user's characteristics and/or interests in order to provide requested and unrequested input. The application parses the messages identified both incoming and outgoing from the user's device and can interact with other entities to obtain information that enhances the known information in the messages identified to provide alternate, additional, or less information to the user. For example, the messages may have a foundational set of characteristics, such as data content, origination address, destination address, etc. However within the core content of the message may be data types, data formats, requests, commands, etc. which could lead the application processing modules to extract additional message characteristics for enhanced processing functions. The application may examine the message and obtain an understanding of the user's characteristics and interests, and examples provide a granular approach to the functionalities of the application.

The foundational block diagram of FIG. 1 provides a basic SDN architecture conFIG.d to perform network traffic manipulation according to example embodiments. Referring to FIG. 1, the diagram 100 includes a main SDN architecture 110 with three sub-components or modules including the application layer 120, the control layer 130 and the infrastructure layer 140. The application layer 120 may process various different applications 122 which are linked to the SDN controller 132. The data input and output of each of the applications 122 corresponds to a number of switches 142 conFIG.d to receive the message forwarding and receiving operations commanded by the SDN controller 132.

Figure 2:
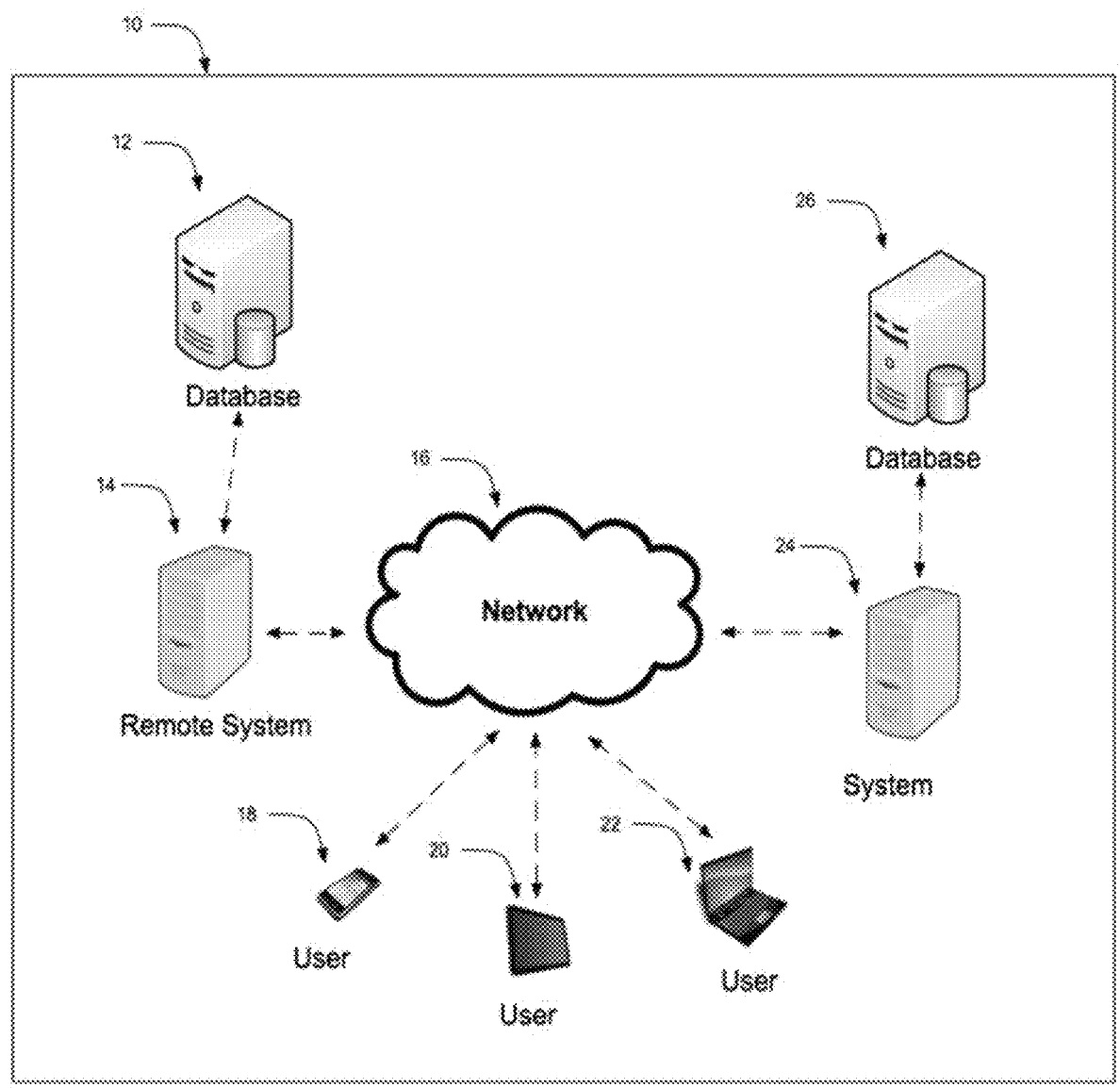
FIG. 2 illustrates a network configuration according to an example embodiment of the present application.

FIG. 2 illustrates a system diagram according to example embodiments. Referring to FIG. 2, a network diagram 10 of the present application permits a user utilizing a mobile client machine 18, a tablet computer 20, a laptop or desktop computer to download from the system server 24 an application to be installed. A client's device may alternatively be a gaming system, a DVD player, or any other device that contains a processor and memory. The present application in the form of software, for example can alternately reside on the client's device 18/20/22 and can be any of a mobile laptop device and/or a personal desktop computer or a mobile device. The computing device 18/20/22 is connected to the network 16, which may be the Internet or any other type of network, through wired or wireless communication. It should be noted that other types of devices, in addition to devices 18/20/22, might be used with the present application. For example, a PDA, an MP3 player or any other wireless device, a gaming device, such as a hand held system or home based system and the like including a P.C. or other wired device that can also transmit and receive information could be used with the present application.

The user of the application can interface with the client device 18/20/22 and connect through the network 16 to the system server 24. The system server 24 can be redundant, or be more than a single entity without deviating from the scope of the application. A database 26 is directly connected to the system server 24 or connected remotely through the network 16 without deviating from the scope of the application.

A remote system server 14 communicates with the network 16. The remote system server 14 can be redundant, or be more than a single entity without deviating from the scope of the application. A database 12 is directly connected to the remote system server 14 or connected remotely through the network 16 without deviating from the scope of the application. The user-database can reside in the system server 24, or the database server 26 either directly connected to the system server 24 or remotely through the network 16.

The application of the current application resides completely or partially on the user's device 18/20/22, which can be a mobile device, but can also reside on a user's desktop computer, a personal digital assistant (PDA), tablet computer, or any other device containing a processor, memory, and an operating system. In addition, the application of the current application can reside on either completely or partially on any one of the other elements in the system illustrated in FIG. 1.

If the application of the current application resides on a device, the application of the current application is downloaded through a platform, such as an application store or market residing on the device or accessed via the device, or may be accessed through the device's browser communicably coupled to the network 16. Further, the application of the current application can be pre-loaded on the device. The current application may operate with any device such as a personal computer with a touch screen, a laptop with a touch screen, a personal computing tablet, a smartphone, a PDA or any device with a processor, memory and a touch screen.

Figure 3:
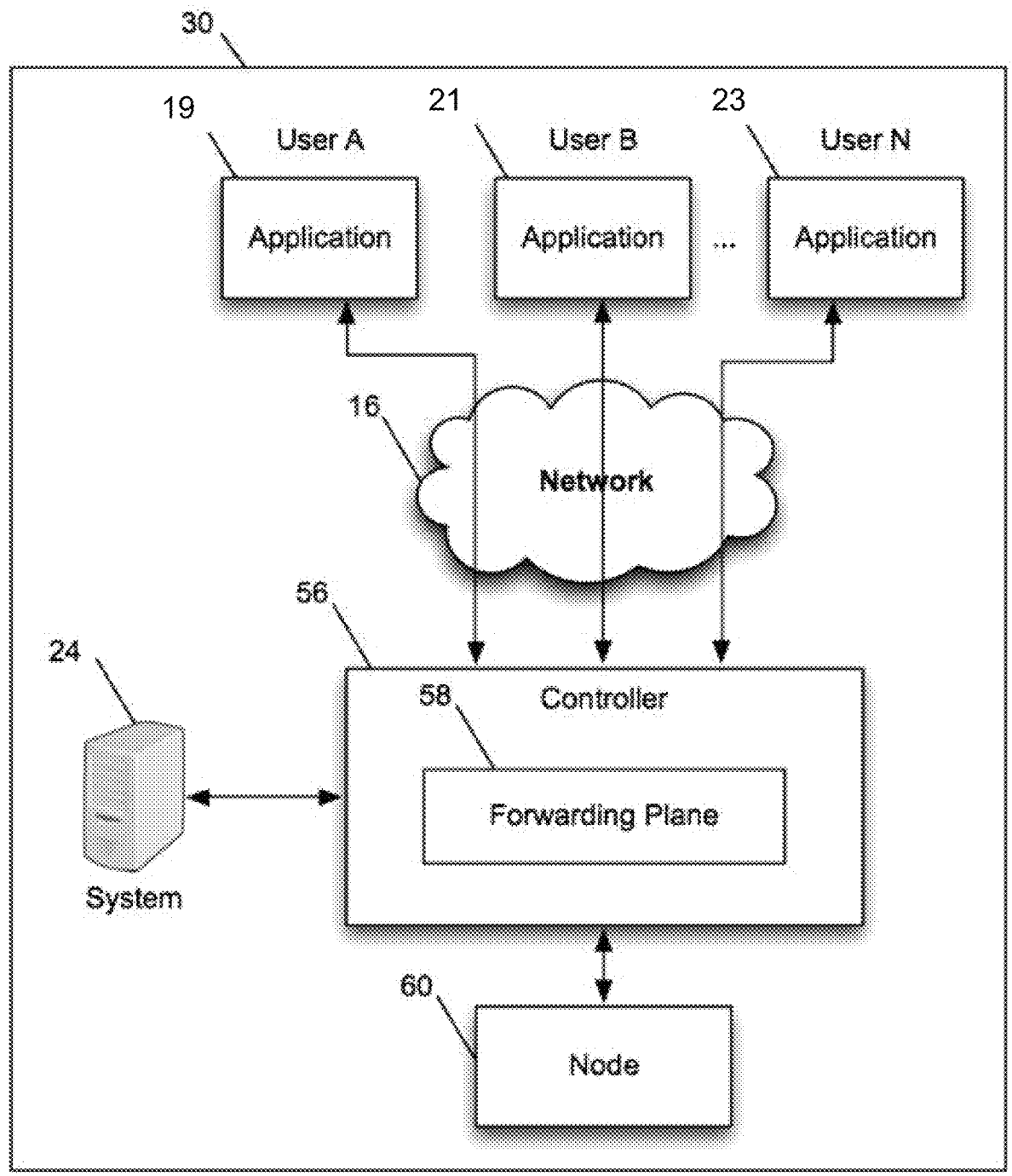
FIG. 3 illustrates a logic diagram of an application architecture according to an example embodiment of the present application.

FIG. 3 illustrates a logic diagram 30 of the application configuration of the present application. The various applications 19, 21 and 23 are correlated with the various user devices 18, 20 and 22 of FIG. 2 as like reference numerals refer to like elements in the various drawings. The controller 56 is an element in the network containing a processor and memory, and may be implemented in any element in the diagram 10, for example, the system server 24, the remote system 14, or the databases 12/26. The controller 56 is responsible for controlling the flow of a subset of information to and from the users (18/20/22). The forwarding plane 58 is responsible for the parsing and filtering the incoming and/or outgoing data. In one embodiment, the forwarding plane 58 can reside inside the controller 56. In another embodiment, the forwarding plane 58 can reside outside the controller 56.

The controller 56 is connected directly or through the network 16 to the system server 24. In another embodiment, user A 18, user B 20 and user 'N' 22 are utilizing the same present application through different devices. In another embodiment and as example only, the application 18/20/22 can be connected to the controller 56 without the network 16. In another embodiment, the node 60 can be communicably coupled to the controller 56 connected through the network 16.

Figure 4:
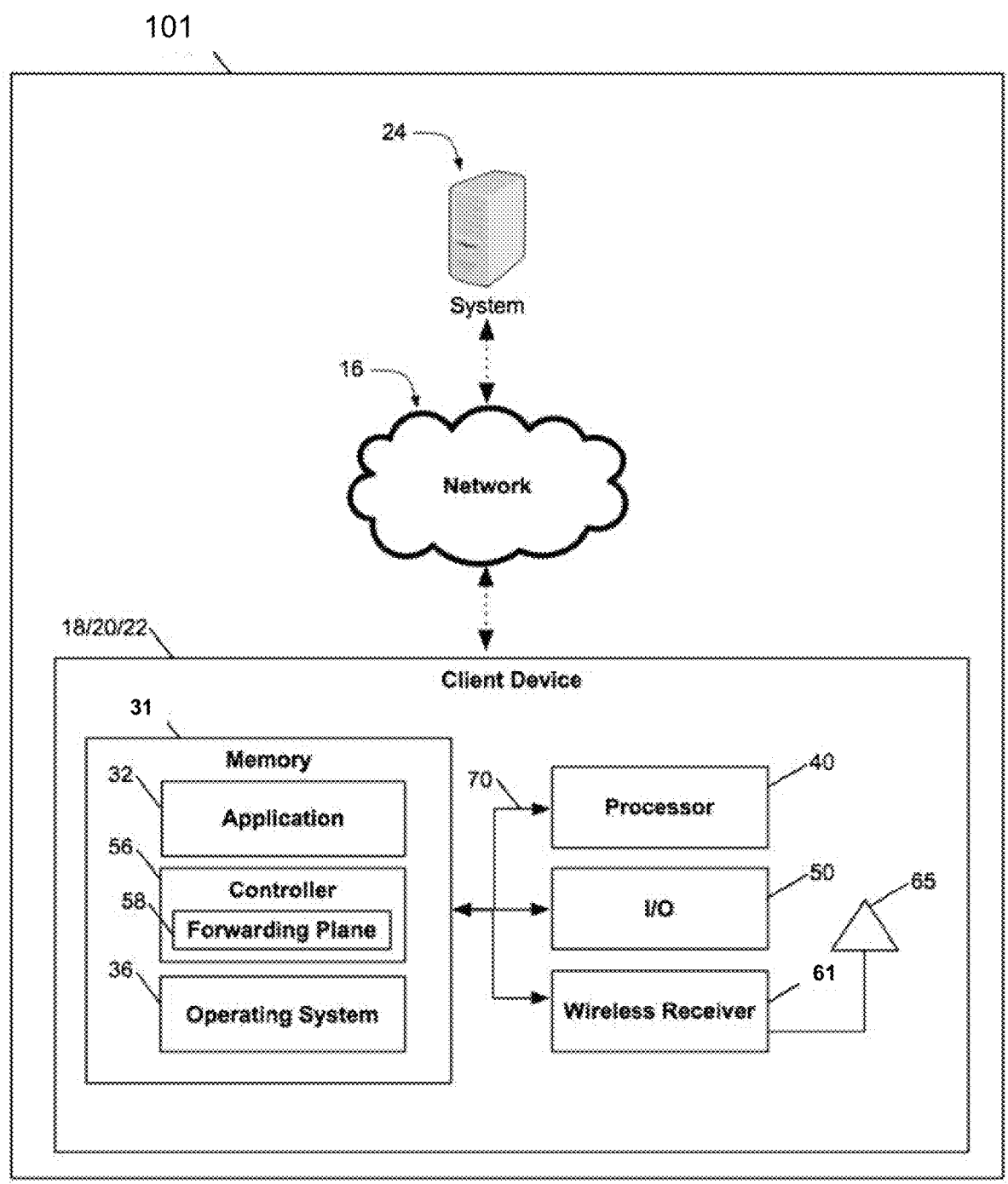
FIG. 4 illustrates an example client device configuration according to an example embodiment of the present application.

FIG. 4 is an example configuration 101 of the controller being part of the client device. Client device 18/20/22 preferably includes microprocessor 40, memory 31, input/output (I/O) components 50, wireless receiver 61 and antenna 65. In an example embodiment, these components of mobile device 18/20/22 are coupled for communication with one another over a suitable bus 70. Memory 31 is preferably implemented as non-volatile electronic memory, such as random access memory (RAM) with a battery back-up module (not shown) such that information stored in memory 31 is not lost when the power to client device 18/20/22 is shut down. A portion of memory 31 is preferably allocated as addressable memory for program execution, while another portion of memory 31 is preferably used for storage, such as to simulate storage on a disc drive. Memory 31 includes operating system 36, one or more application program(s) 32, such as a personal information manager or PIM as well as a controller 56. A forwarding plane 58 exists in the controller 56. During operation, operating system 36 is preferably executed by processor 40 from memory 31. I/O components 50 are provided to facilitate input and output operations from a user of client device 18/20/22. The client device 18/20/22 is coupled to the network 16.

In operation, the sent and/or received data to and from a user device 18/20/22 of the current application 32 is either sent out, or received by the application 32. The messages are "filtered" through the controller 56 via certain filtering criteria. The controller 56 communicates with the system server through the network 16. Unfiltered or 'raw data' can potentially be a duplicate of previously received information, or information that the user may not be interested in pursuing due to various reasons. This application filters and examines incoming and outgoing information that may be considered uninteresting to the user or the recipients of the outgoing information.

Figure 5:
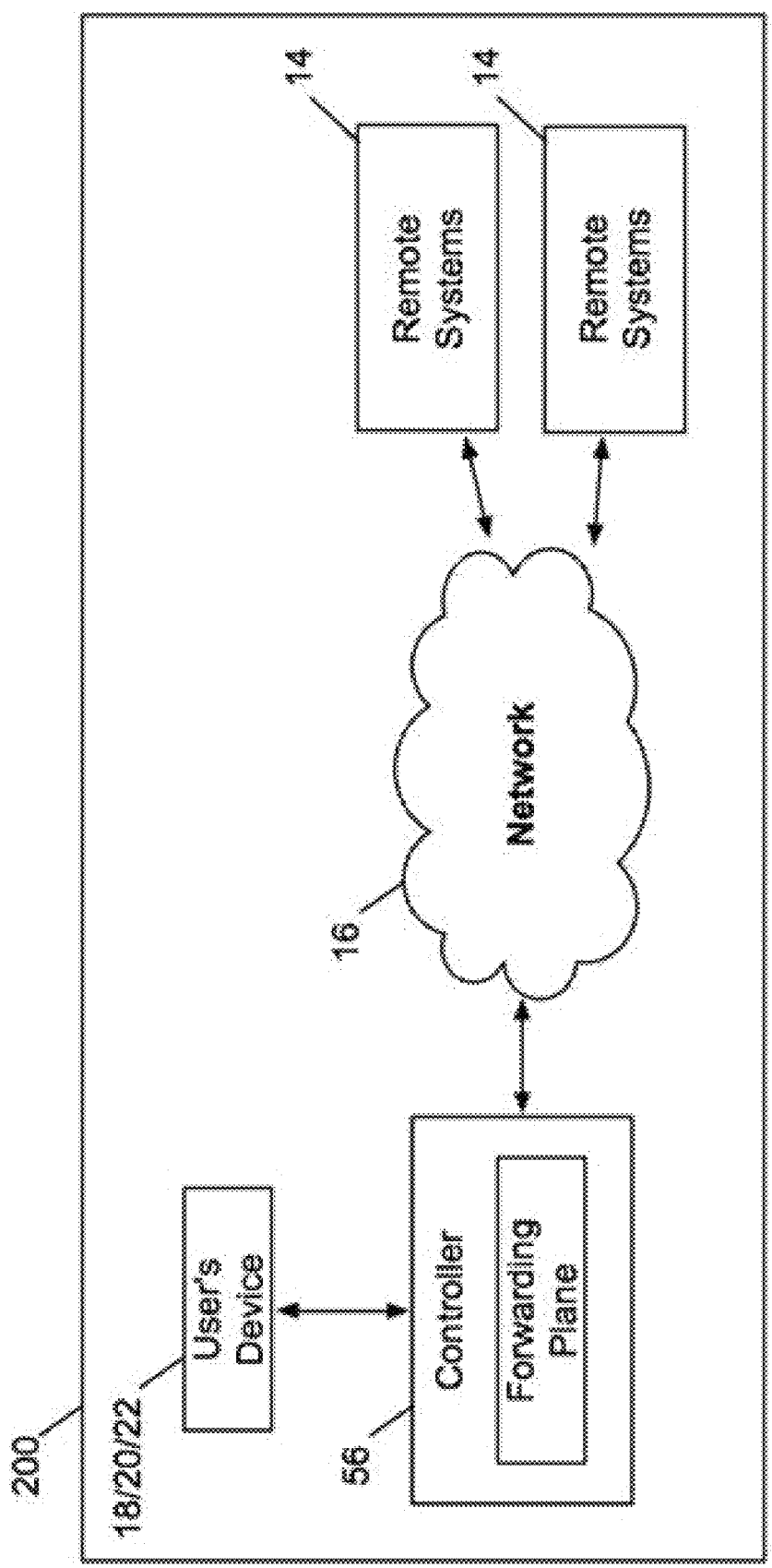
FIG. 5 illustrates another example logic diagram according to example embodiments of the present application.

FIG. 5 illustrates an example configuration 200 of the controller being outside the client device 18/20/22. Referring to FIG. 5, the controller 56 is across the network from the remote system servers 14 and the user's device as depicted by the network 16 and the other network elements. The client device 18/20/22 interacts with the controller 56 so message(s) are first passed through the controller 56 before being sent to the network 16 for outgoing messages or sent to the client device 18/20/22 for incoming messages.

In an example where further information is sought, the controller 56 accesses remote systems devices 14 through the network 16. The remote system devices 14 may be functionally setup via an application program interfaces (API). Using the APIs or a similar interaction, the controller 56 may obtain information that offers additional input that may be sent to the client device 18/20/22 without the user directly requesting additional information. The remote system devices 14 may be any remote element in the network containing a processor and memory, and which is coupled to the network 16 through any communication protocol normally utilized in communication between a computer and a network.

To provide a procedure of analyzing classifying and/or controlling outgoing and incoming messages, a message gateway or 'controller' 56 may process all such outgoing messages by filtering such messages before leaving the organization. This permits some control over the messages from an organization and validates the messages being delivered to the network. In operation, messages are "captured" in the controller 56 prior to being transmitted. Once captured by the controller 56, the messages are compared to previously delivered messages to verify that the outgoing messages are different from the previously logged messages. Other procedures may include determining the messages are similar but from a different sender/receiver and/or whether the messages are provided in a different format.

Messages captured may be compared to those that were previously received and compared against those that are considered "real time" and those that are considered historical messages. In one embodiment, a predetermined value is set to determine which messages are real-time messages and which are historical messages (e.g., 2, hours, 4 hours, etc.).

Incoming information may be delivered to the user such that the information is optimized to be of a greater level of interest to the user than would normally be received. This information may be from other people/users or generated from the system server 24 based on interaction between the system server 24 and the controller 56/forwarding plane 58. The system server 24 may analyze the information being received and determine that the information is a duplicate of already received information, or determine that other related information would be more useful to the user as the preferences and characteristics of the user are identified.

The controller 56 is responsible for handling the messaging both incoming and outgoing to the client device 18/20/22. Messages are sent through the controller and pre-processed prior to being transmitted. Once processed, the messages are either sent up to the client device 18/20/22 or to the network 16 or node 60 of FIG. 3. In one example embodiment, data contained in the controller 56 may contain more real-time data than historical data as compared to the system/DB 24/26 which may contain more historical data. The controller 56 decides how to respond to users by analyzing the incoming messages and interacting with the previous messages and other data stored in a coupled element, such as the system server 24. The forwarding plane 58 may be located inside the controller 56. This element is responsible for forwarding the message(s) to obtain more information.

When processing the data in the forwarding plane 58, the controller 56 can queue the data for use at a later time, forward the data to another network element, delete the data, alter and/or augment the data (i.e., add, replace, reword, include image/video from a data source) prior to transmitting the data to its intended destination. In operation, the data the user is transmitting may be modified based on user preferences, user characteristics and other user based criteria prior to transmitting the data from the user device.

The application may perform certain operations in order to understand the user. This understanding relates to not only the interests of the user, but the normal interactions between the user and other people. For example, interest groups, such as other people in the user's organization, work environment or other people in other work environments. The current application may determine the user's characteristics and interests and how the user interacts with others through interactions (i.e. messaging, applications, etc.).

The application can gain an understanding of the user by examining any or all of information that has been received by the user device, such as when the user is online, advertisement information that the user may have selected on a user interface, searches submitted and information requested, groups that the user has obtained member, emails that the user sent or received, calendar events currently subscribed to the user, historical web surfing habits stored in web history locations, a current location of the user as obtained from IP address, GPS, or other location functions, online games that the user has accessed, digital video recordings (DVR) programs, live video streaming/Internet protocol television (IPTV), web-based shows, television-based shows, radio/music platforms/music applications/music players, GPS, cellular/mobile device usage, etc.

In one example, the user's history of online web access may include the web history stored in a web history file on the user's device and data stored in the network 16. All the web browsers retain Internet surfing information in the form of files stored on the user's device. These web history files can be processed to determine information that can aid the application in delivering messages related to the user. For example, a request initiated by a user device may reference the web history file for additional information and may include such additional information or at least cross-reference the information in the request message to confirm or add additional information based on information in the web history file.

Other options can be employed to gain an understanding of the user's previous Internet surfing history. For instance, GOOGLE and YAHOO, offer free services that can be utilized to perform email capabilities, manage groups, search the web, manage information, such as advertisements, manage calendar activities, manage documents, as well as many other services. This approach differs substantially from the conventional approaches since the current application provides the ability to create/modify messages based on information that has appeared in the user's information sources.

In another embodiment of the current application, the application can continue to monitor the user's information and provide updates to the search results reflecting changes in the user, such as the user device location or newly identified interests. The user's data results from the user's local data files (i.e., tracking files) or client device 18/20/22 can be weighed against the user's data results returned from the remote system server 14 so the weighing operation can determine a priority of the results. The remote system server 14 can include information pertaining to the user and stored in the cloud or network 16. When obtaining the user's data, the latest data with a most current timestamp can be given a higher weight than older data.

The messages are received and processed by the controller 56 of the client device 18/20/22. The controller 56 filters out incoming messages in the device prior to sending them to the executing application to handle the incoming message. In one embodiment, the incoming message is analyzed to determine if further processing is necessary, such as checking for duplicate content in the message, checking for alternative content in place of the message, determining if a different source of the information is necessary, etc. The message is forwarded to the system 24 for the additional processing if the controller 56 determines that it is necessary. Messages are parsed prior to being passed through the network. In one embodiment, messages incoming to the controller 56 are parsed and the content in the message is examined and actions are taken to the contents of the message prior to transmitting the message to its destination.

In parsing a message, a first functionality may be to clean-up the message by forcing each character to lowercase and by trimming the whitespace off the beginning and the end of the string. Such syntax may provide $message=strtolower($message) and $message=trim($message). The first function (strtolower) converts the entire string (or messge) to lower case. The second function (trim), the whitespace at the beginning and end of the string is removed. At this point, regular expressions (regex) can be utilized to convert the elements of the message into words. These words can be stored and compared against other words. Parsing text in the message may provide traversing through the text, separating the words via white spaces and storing the words into a programming structure, for example, an array of characters.

In this example embodiment, the controller 56 parses through the incoming messages using currently accepted parsing languages, such as the PERL language, which permits the application to sort through the text. The PERL "split" function is used to break-up the line into separate words that can then be further processed as individual words instead of lines or sentences. Other PERL based generators include: Parse-RecDescent which provides the ability to generate on-the-fly recursive-descent parsing, Regexp-Grammars which provides an implementation of the future PERL-6 grammars, Parse::Yapp which can be compared with the well-known 'yacc' parse generator tool, Parse::Eyapp—an extended version of Parse::Yapp including new recursive constructs.

Example embodiments of the present application permit for the examination of the contents of messages sent and received from a user's device. This examination procedure permits for the possibility of enhancing the conversation by adding messages obtained by sources that are external to the users in the conversation and henceforth referred to as "Trusted Sources". The point in the conversation that these trusted sources are queried, referred to as the conversation trigger point, is established based on various criteria. The trigger point may be predetermined and established in the application by the designer of the application or may be determined by the number of instances a particular word and/or phrase exists in the conversation, such as a relative degree of interest. For example, a first user statement may be parsed to identify one or more topics. Then a clock or timer may be initiated to observe any other users' statements that are parsed and identify a similar topic within the time permitted by the timer or observation window. One implementation may be to require "N" conversational statement (e.g., 3 or more) be parsed and identified as similar subject matter within a time frame of 10 minutes.

Trigger points may be established according to specific criteria, such as the number of times a word/phrase is repeated in the conversation/message in which that number exceeds a predetermined threshold established in either the hardcoded software, or preconfigured in the configuration module of the software. That particular predetermined threshold value may be input by the user. The mentioning of a product/service/application word or phrase in the conversation/message can be identified and compared to the product/service/application that is contained in either a list document established in either the hardcoded software, or preconfigured in the configuration module of the software. Any of those terms may be modified and updated by the user. Another trigger point event may include the mentioning of any other word/phrase (i.e. a business name) in the conversation/message where the identified word or phrase is contained in either a list established in either the hardcoded software or preconfigured in the configuration module of the software. The interest in the 'topic' is further understood to be either a mentioning of a predetermined word/phrase and/or the number of times a predetermined word/phrase is present in a written conversation or message posting. To aid in determining the topic from a conversation, natural language processing (NLP) software may be utilized and inter-worked into the application to aid in parsing the text in the conversation and determine meaning and therefore topics.

Messages that are incoming to the client device 18/20/22 and outgoing from the client device 18/20/22 are processed in the controller 56 in one embodiment and the messages are parsed and split into words and can be stored in the system/DB 24/26. Once stored, the data can be queried and trends in the data discovered accordingly. Trends can be a repeated subject within the messages in the conversation, questions that may arise in the conversation, concerns that are identified in the conversation or any subjective content that is repeated more than once in a given time frame and/or is deemed important by the application subject audit function. Once a trigger point is identified, a message is sent to the system server 24 to determine that an third party data source is to be queried for additional information. The system server 24, in one embodiment, can then initiate the querying of the external entity.

The external entity to be queried is either determined automatically by the system server 24 or via a predetermined configuration area of the current application. The external entity can be entities such as an online medicinal website, for example, if the users are conversing about health related matters. Online medicine related websites provides access to medicine topic data in a XML format. The service accepts keyword searches as requests and returns links to relevant English-language health topics in a ranked order. The output also includes supplemental data, such as health topic summaries, related vocabulary, and keyword-in-context snippets.

Interacting with external entities through APIs permits the current application to gain additional information on a particular subject, such as a subject being discussed in a conversation between users of the current application.

The current application seeks to obtain additional information from sources that are connected to the network 16 or Internet/cloud data source. This source may be predetermined by the configuration area of the current application or may be determined in real-time according to other factors including the number of times a particular word or group of words exist in the conversation. The conversation is a group of messages that have been tokenized and/or parsed to assist in determining the content of each of the messages in the conversation. To identify the subject of the conversation may include identifying a product and/or application mentioned in the conversation. Also, the identification of a business entity in the conversation may also produce a trigger and action by the application monitoring the conversation.

In the above examples, a determination of the number of instances of the particular subjective content is determined as the trigger point that assistance on the subject matter is to be sought. One or more of the following non-inclusive list may provide identifying a predetermined number of messages in the conversation as established by the user in the configuration area of the application or which may be automatically determined by the designer of the current application. A predetermined number of instances of the same word/phrase as the word/phrase instances are obtained by the parsing of the messages. The number of instances being established in the configuration area of the current application or automatically determined by the operator of the current application over a predetermined period of time may be adequate criteria for identifying a particular area of interest. Also, a question may be asked by one of the users in the conversation to trigger a subjective analysis of the terms and the information that follows that question.

The current application attempts to understand the user. This understanding relates to not only the interests of the user, but the normal interactions between the user and other people (for example, interest groups such as other people in the user's organization, i.e. work environment or other people in other work environments).

The current application seeks to determine the user's characteristics and interests and how the user interacts with others through interactions (i.e. messaging, applications, etc.). The application can identify an understanding of the user by examining any or all of the following, including: information that has been served to the user (for example, when the user is online), information, such as advertisements, that the user selected, searches requested by the user account, group memberships linked to the user, emails that the user sent or received, calendar events linked to the user, historical surfing habits, a current location of the user, online games that the user has participated, DVR television programs liked to a user account, live video streaming/IPTV, web-based shows and genres, TV based shows, radio/music platforms/music applications/music players linked or used by the user and GPS coordinates linked to the user, cellular/mobile device usage, etc.

One way to use the history of the user's online surfing is through the history on the user's device and data stored in the network 16. All web browsers retain Internet surfing information in the form of files stored on the user's device. These files can be scanned to determine information that can aid the application in delivering messages related to the user. Other procedures can be employed to gain an understanding of the user's previous Internet surfing history. GOOGLE and YAHOO, for instance, offer free services that users can utilize to perform email capabilities, manage groups, search the web, manage information (such as advertisements), manage calendar activities, manage documents, as well as many other services. This differs substantially from the conventional approaches in that the current disclosure provides the ability to identify user characteristics based on information that has historically appeared in the user's information. In another embodiment of the current application, the application can continue to monitor the user's information and provide updates to the search results reflecting changes in the user, for instance, the location, or interests.

In another embodiment of the current application, the user's data results from the user's local system (tracking files) or client device 18/20/22 can be weighed against the user's data results returned from the remote system server 14 where a weighing system is in place to determine the priority of the results. The remote system 14 can include information pertaining to the user and stored in the cloud or network 16. When obtaining the user's data, the latest data with the most current timestamp can be given a higher weight than older data. The FIG. below demonstrates an example weighing system that can be utilized to determine which data is most useful to the current application.

The system is able to monitor conversations and inject (or add messages) to the user(s) that offer additional, unrequested input to the conversation. Through the controller 56, outside entities, such as those able to offer alternatives, or additional input are interacted with through the network 16. These entities can be any entity, but may be entities that are able to offer a professional level of input. For example, professional investment entities would be contacted if the conversation were regarding personal investments. In the example below, a depiction is examined that includes one implementation of the current application. Elements in the depiction can be used differently, or other elements not shown can be utilized to perform the same or similar functionality without deviating from the scope of the current application.

Figure 6:
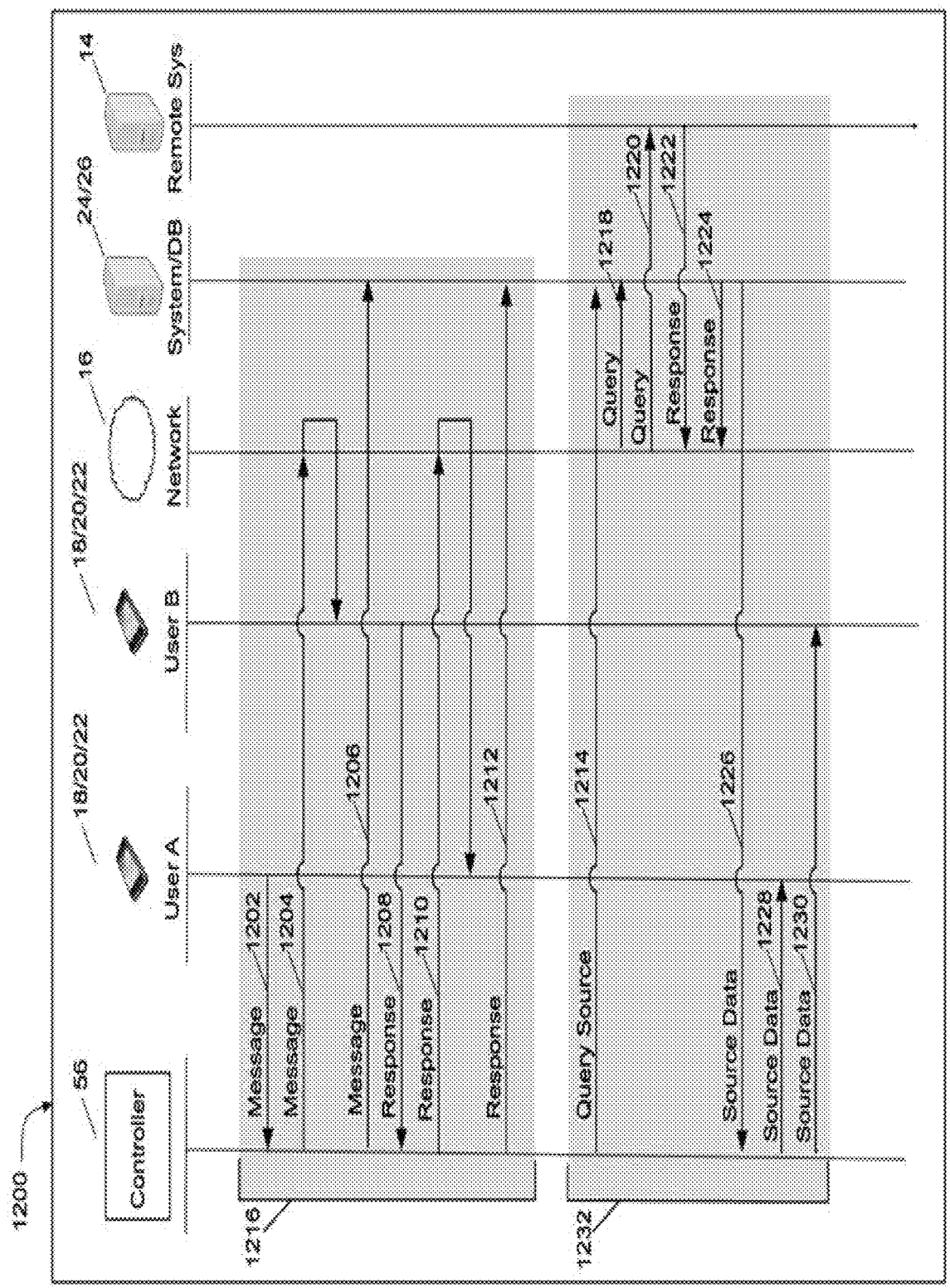
FIG. 6 illustrates an example system signaling diagram according to an example embodiment of the present application.

FIG. 6 illustrates a flowchart of one possible implementation of the current application. The flowchart 1200 illustrates the functionality in the controller 56 and system/database 24/26 where the content from the Internet (or network 16) is injected into the conversation between users A and B 18/20/22. There are two portions of the message flow that can be repeated one or more times (1216 and 1232). The first portion 1216 is the flow of messages between the two users in the conversation, in this case User A and User B 18/20/22. The users can access the current application via any device that is a device containing a processor and memory and the application is executing in the memory of the client device 18/20/22. In the message flow, there exists a message from User A's client device 18/20/22 and a single response from User B's client device 18/20/22. This flow of messaging can be repeated as well as messages can follow a different flow. For example, User A may send more than one message to User B, and User B may send more than one message to User A. Also, either or both User A and User B can also add another user to the conversation without deviating from the scope of the current application.

The second flow of messages 1232 is the querying of the Internet or network 16. This query may be sent multiple times and intervals that is either automatic or predetermined at specific intervals. In the message flow, the conversation begins by User A's client device 18/20/22 sending a message 1202 to User B's client device 18/20/22. This message is sent to the controller 56, as messages can be sent through the controller 56 prior to being transmitted. In another embodiment, the controller 56 may also parse the message to obtain an understanding of the contents of the message. The message may also be stored in the controller permitting the controller 56 to gain an understanding of the message flow. The controller 56, upon receiving the message sends the message 1204 to the recipient, in this case user B's client device 18/20/22 through the network 16. The message is also, in this embodiment sent to the system/DB 24/26. This message 1206 is routed through the network 16 to the system/DB 24/26. This message is stored in the system/DB 24/26 for future reference as well as other possible functionalities. User B then sends a response message 1208 to User A. The response message 1208 is received by the controller 56, then routed 1210 to User A's client device 18/20/22 through the network 16.

In another embodiment, the controller 56 may also parse the message to obtain an understanding of the contents of the message. The message may also be stored in the controller permitting the controller 56 to identify the message flow. The message is also sent to the system/DB 24/26. This message 1212 is routed through the network 16 to the system/DB 24/26. This message is stored in the system/DB 24/26 for future reference as well as other possible functionalities. The controller 56 determines that an external source is to be queried. This can occur at predetermined intervals, at a time when the conversation warrants the need for an external source data to be input into the conversation, or at another determined timeframe. The controller 56 sends a query source message 1214, routed through the network 16 and routed to the system/DB 24/26. This message can contain the full contents of the conversation up to this point, information regarding the two (or more) recipients in the conversation, personal data relating to the two or more users in the conversation, parsed messages in the conversation, keywords that are determined from the parsed messages, etc.

The system/DB 24/26 builds a query that is sent to any entity coupled to the network 16. This can be an entity or entities that offer another viewpoint related or not related to the subject and/or keywords in the current conversation, a professional aspect related to the subject and/or keywords in the current conversation, or any other entity that provides another viewpoint to the subject and/or keywords in the current conversation.

The system/DB 24/26 sends a query message 1218 to the network 16 routed 1220 to the remote system 14. This remote system 14 is any element coupled with the network where interaction can be through published APIs or any other interaction of a similar manner regularly understood in communication with the network 16. The remote system 14 sends a response message 1222 sent to the network 16 and routed 1224 to the system/DB 24/26. The system/DB 24/26 processes the response message 1224 by analyzing the content of the message and formulates a message for the users in the conversation. This message may contain further insight into the conversation from another perspective, a more professional point of view, other aspects of the conversation. This message may also indicate that the message is not part of the conversation, but from another entity that is outside of the conversation permitting the users to have an understanding that the message pertains to the conversation, but is not from the users in the conversation.

The source data message 1226 which is the response to the query source message 1214 is sent to the controller 56. The message is sent to the network 16 and routed to the controller 56. The controller 56 receives the message and can process the message prior to sending it along. It may determine that the message should be sent to one party in the conversation, more than one party in the conversation, or all parties in the conversation. In this scenario, the message is routed to all parties in the conversation. The source data message 1228 is sent to User A's client device 18/20/22 and 1230 User B's client device 18/20/22. The presentation of the source data may have a different view when displayed on the client device 18/20/22. For example, the message may be different in nature than a message received from another party in the conversation. The message may be shaded a different color or gray scale, offer a different text component that unlike the normal message from another party in the conversation, offer a different text family or characteristic (i.e. italics/bold/etc.), or any other difference that the user will easily be able to differentiate between a message received from the system/DB 24/26 and another user in the conversation.

Figure 7:
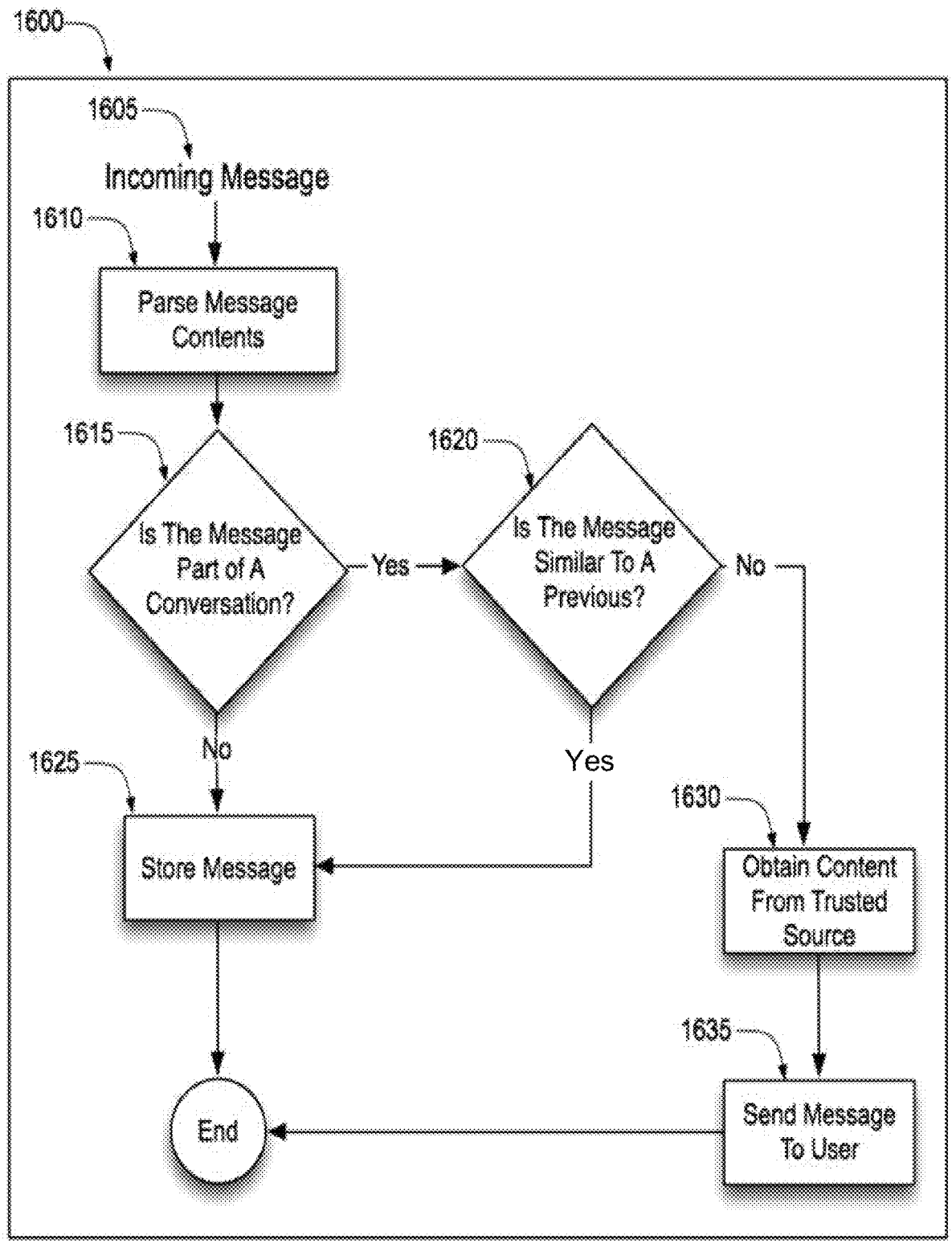
FIG. 7 illustrates an example logic flow diagram according to an example embodiment of the present application.

FIG. 7 illustrates a flowchart 1600 of one possible implementation of the current application where the Internet (or network) is utilized to obtain information from a trusted source. The flowchart illustrates the functionality in the system device 24 which receives a message 1605 sent from an external element. The contents of the message 1605 are parsed 1610 permitting the system 24 to traverse through the contents of the message as described. In one embodiment, a check is made to determine if this message is part of an already ongoing conversation 1615. This can be determined by comparing at least one of the parts of the message compared to other stored messages in the system 24. If the message is not currently part of a conversation, then the message is stored for future use 1625 in the system 24 and the process ends. The stored message can be internal to the system device 24 or in a coupled database 26. The stored message may be utilized at a later time by the system 24 such that all messages received related to a given issue can be obtained to determine statistics related to the issue.

If the message is part of a current conversation, then the previous conversation elements are parsed to determine if the current message is the same or similar to other elements in the conversation 1620. For example, if a predetermined number of words existing in the previous conversational element, or a phrase or phrases exist in the previous element of the conversation (i.e., conversation statement) then the subjective content of those statements may be deemed similar or the same. If the message is not similar to a previous message, then the message is stored in either the system 24 or the connected database 26 and the process ends. If the message is similar to a previous message, then the system 24 attempts to obtain content from a "Trusted Source" 1630, which is a source that is known and/or trusted by the entity. For example, a list of sources is determined and the APIs or other mechanisms that achieve the same or similar results are utilized to obtain content from the source. These sources reflect the topic of the message. For example, trusted professional sources in areas of IT software and hardware, trusted sources in the area of investments (e.g., 401k, stocks, bonds, IRAs, etc.), other professionals in the business area related to the business organization, etc. The content is obtained from the trusted source and a message is generated 1635 and sent to the client device 18/20/22, and the process ends.

One example of a conversation conducted on a computing platform may be a series of text messages shared by a group of users. The conversation regularly contains the word bond. The messages in the conversation are also stored in the system/DB 24/26 so they can be queried for patterns and trigger points where third party data should be retrieved and interjected into the conversation. Once analyzed, the system 24 determines that additional input regarding bond investments may be beneficial to the users in the conversation thus a query message is generated from a trusted source.

Figure 8:
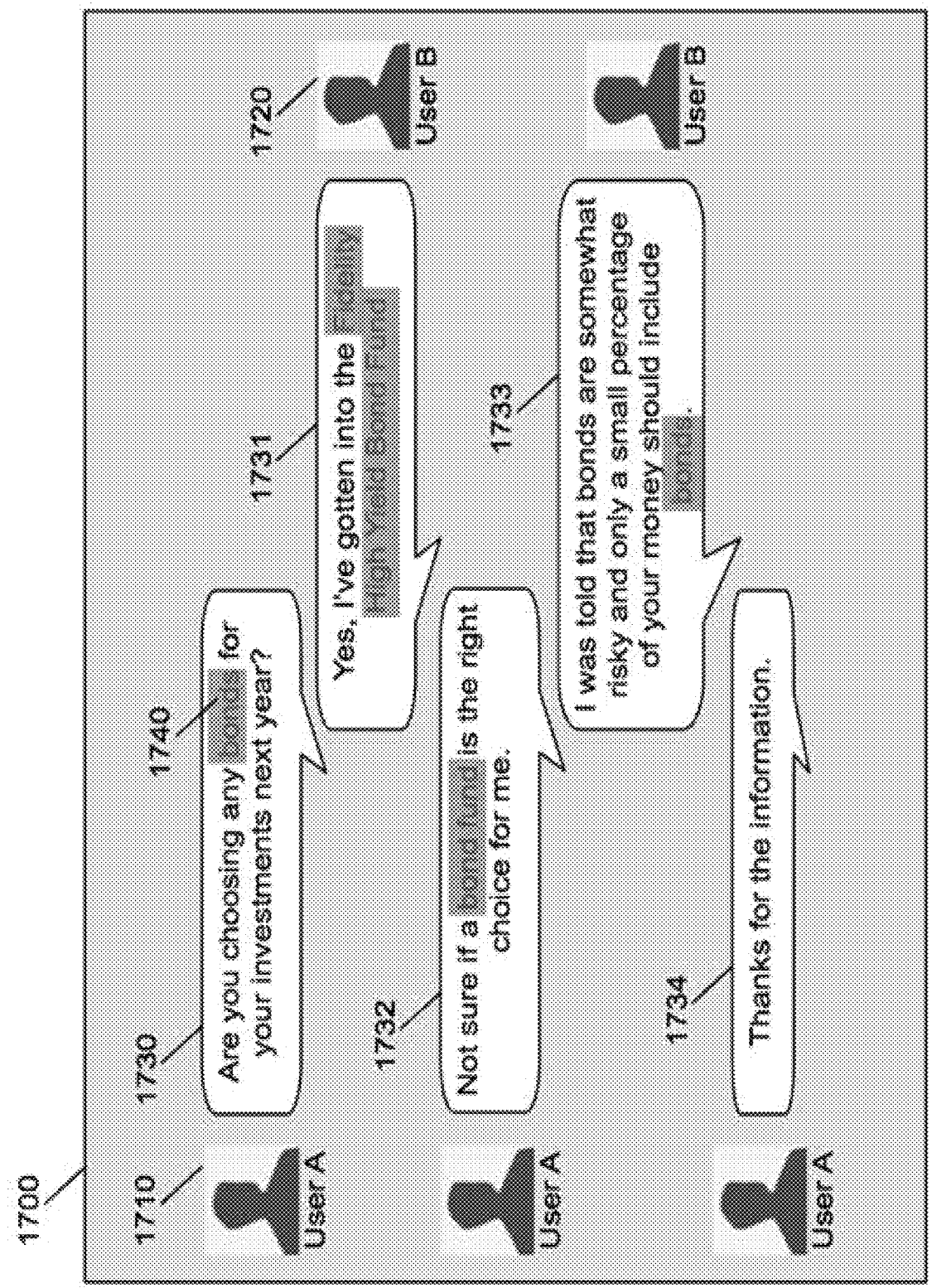
FIG. 8 illustrates an example online conversation according to example embodiments of the present application.

FIG. 8 is an example of conversation being examined by the application for trigger points and interjection. The particular example attempts to offer options that may be made available to the user through interactions with the application. FIG. 8 illustrates a GUI depiction 1700 of one possible implementation of the current application hosting a conversation between two users (1710-A and 1720-B). Messages in the conversation 1730-1734 are illustrated for each of the respective users in the conversation. Also of note, the highlighted words in the messages 1740 are words that are utilized by the system 24 to form the queries sent to the trusted sources or the remote systems 14.

In one embodiment, the words are actually highlighted in the GUI on the client device 18/20/22 permitting the user(s) to view the words that the system 24 is using, or planning on using for additional input into the conversation. In another embodiment, the words are utilized without being displayed as altered text to the user on the client device 18/20/22.

Figure 9:
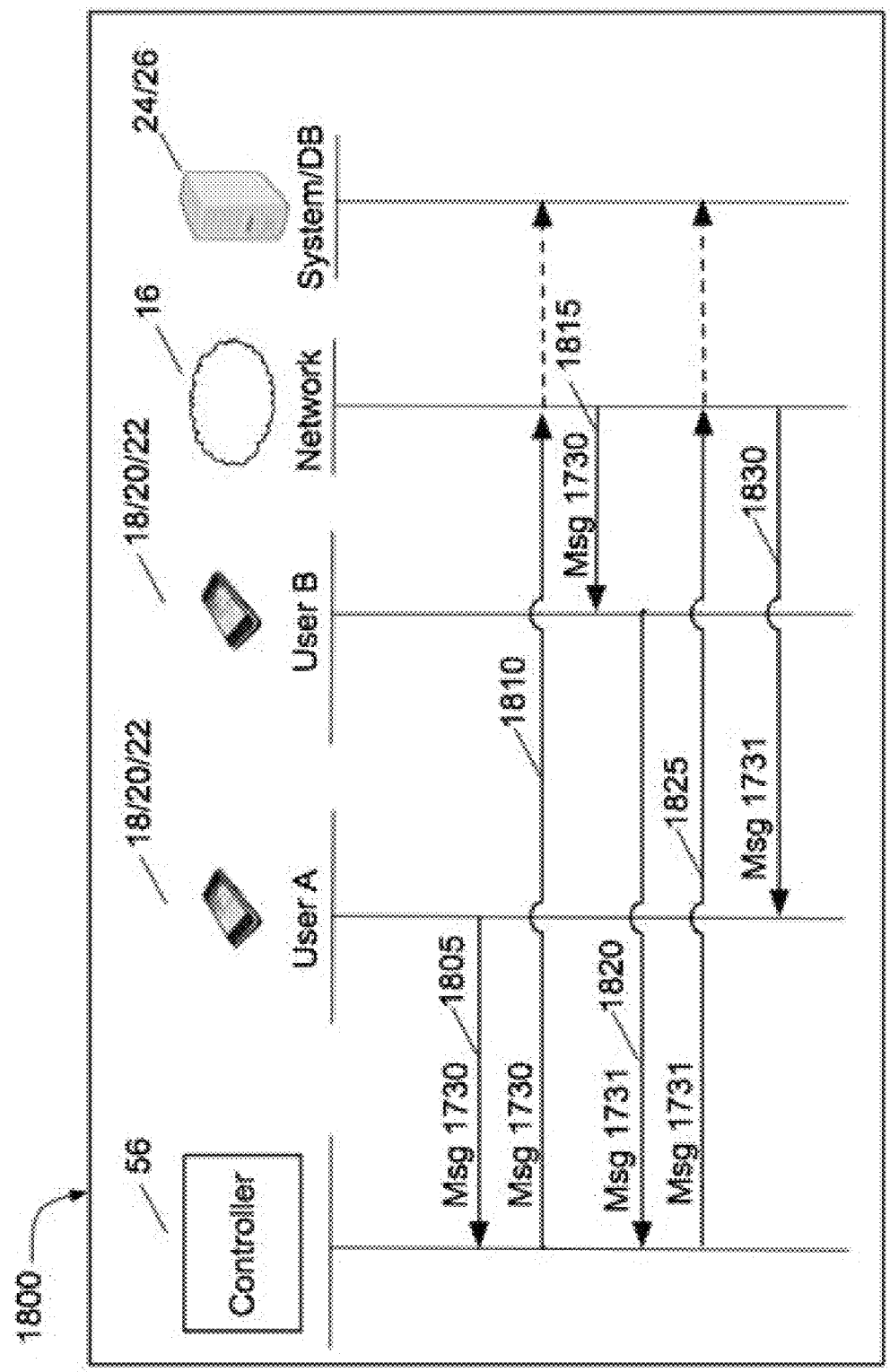
FIG. 9 illustrates yet another system signaling diagram according to example embodiments of the present application.

FIG. 9 illustrates a message flow 1800 of one possible implementation of the current application with the message flow of the first messages 1730 and 1731 between User A and User B in the FIG. 8. In operation, User A begins the conversation by sending a message 1730 to User B 1805 as the recipient with the message contents: "Are you choosing any bonds for your investments next year?" This message is sent to the controller and routed through the network 16 1810 to User B's client device 18/20/22 1815. The message is also sent to the system/DB 24/26 as messages are stored in the system/DB 24/26. User B sends a response message 1731 to User A 1820 with the message contents: "Yes, I've gotten into the Fidelity High Yield Bond Fund". This message is sent to the controller 56 and routed through the network 16 1825 to User A's client device 18/20/22 1830. The message is also sent to the system/DB 24/26. Having received both of the messages 1730 and 1731, the system 24 begins to process the messages to identify the common subject 1740 and so it may offer one or more of the following options to User A in an information message: 1. Fidelity High Yield Bond Fund (10% of portfolio), 2. PimCo Bond Fund (10% of portfolio), 3. Bond Fund is not recommended, 4. Instead of a bond investment, buy ABC Gold Fund (5.4% of portfolio), 5. Reduce company stock holding (6.5% of portfolio) and buy ABC Mutual Fund (X % of portfolio).

These example options are presented to User A via an information message that is sent from the system 24 to one or more users in the conversation. These messages are not initiated by the users in the conversation but are automatically generated and sent by the system 24 as determined by the system 24 from the processing of the messages in the conversation and stored in the system 24.

Figure 10:
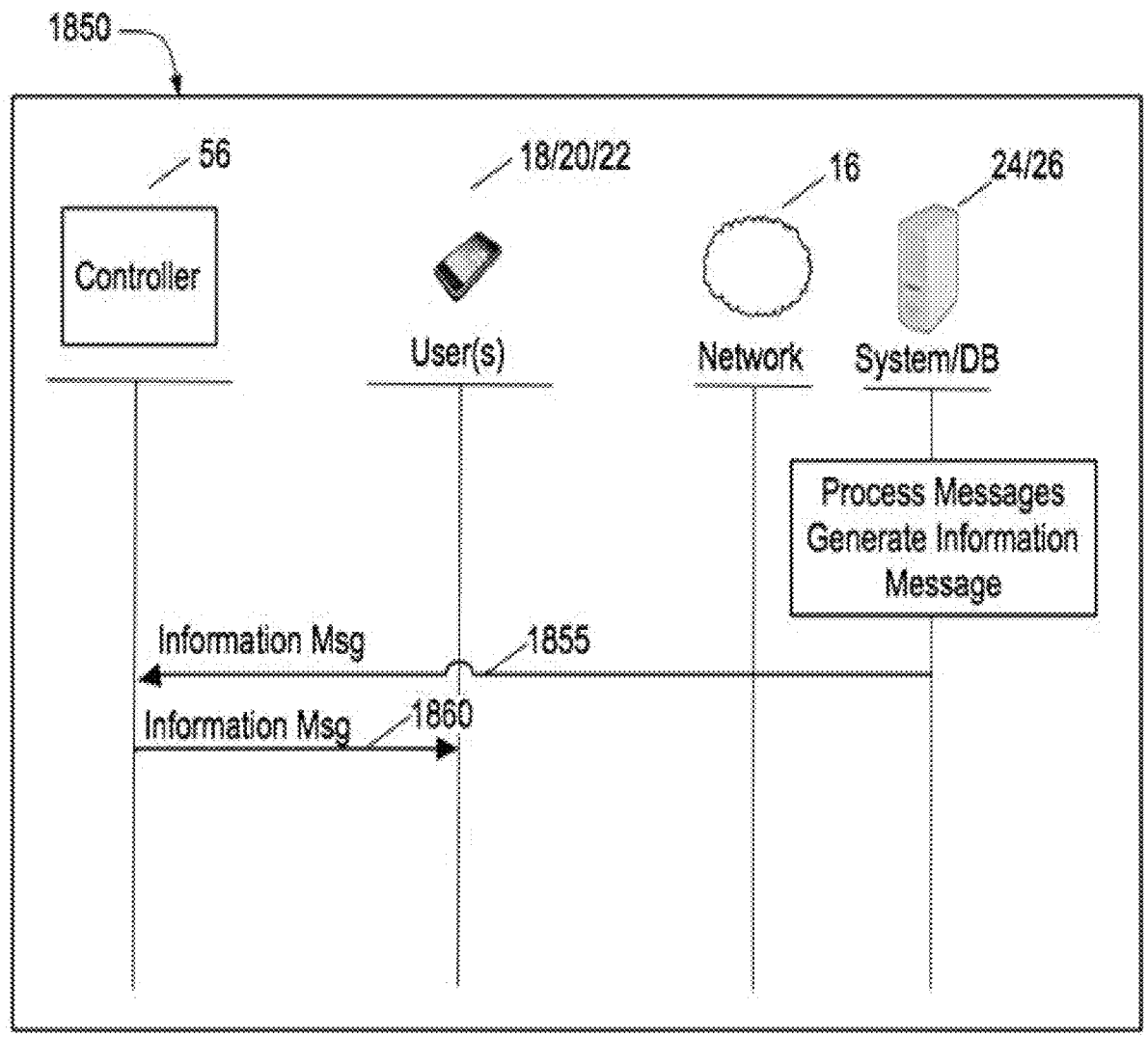
FIG. 10 illustrates still yet another system signaling diagram according to example embodiments of the present application.

FIG. 10 is a message flow of a possible implementation of the current application 1850. The message flow is a continuation of the example in FIGS. 8 and 9. As the system 24 has received two messages between a conversation of User A and User B. The messages are processed by the system 24 and determined that the subject of the conversation is investments and more specifically, bond investments. Also of note is the mentioning of "Fidelity High Yield Bond Fund". The word "bond" is found in each of the first two messages in the conversation and the system 24 begins to interact with external or internal trusted sources to gain additional perspective that may be of interest to the user(s) in the conversation. This is accomplished by interacting with external APIs that are published by entities of the trusted sources.

In another example, the system 24 has an understanding of the characteristics of the user(s) in the conversation. Through the use of this functionality, the user's age, income, marital status, career, geographic location, family status, etc., is determined and permits the system 24 to further determine the investment decisions for the user. The controller 56 sends the information message 1855 to the recipients of the message 1860. It can be sent to one, more than one, or all users in the conversation. The data within the information message 1855/1860 is displayed on the client device 18/20/22 recipient of the message by the system 24. When displayed, a button component or some other component that permits interaction between the client device display and the user is presented to the user interface. For example, a button component entitled "Accept".

In another example, the button component is listed besides each item in the case where there is more than one selection displayed. Upon selecting the component, a message is sent to the remote system 14 associated with the entity of that trusted source. This permits the internal or external trusted source to perform the changes associated with the item listed on the display of the client device 18/20/22.

Figure 11:
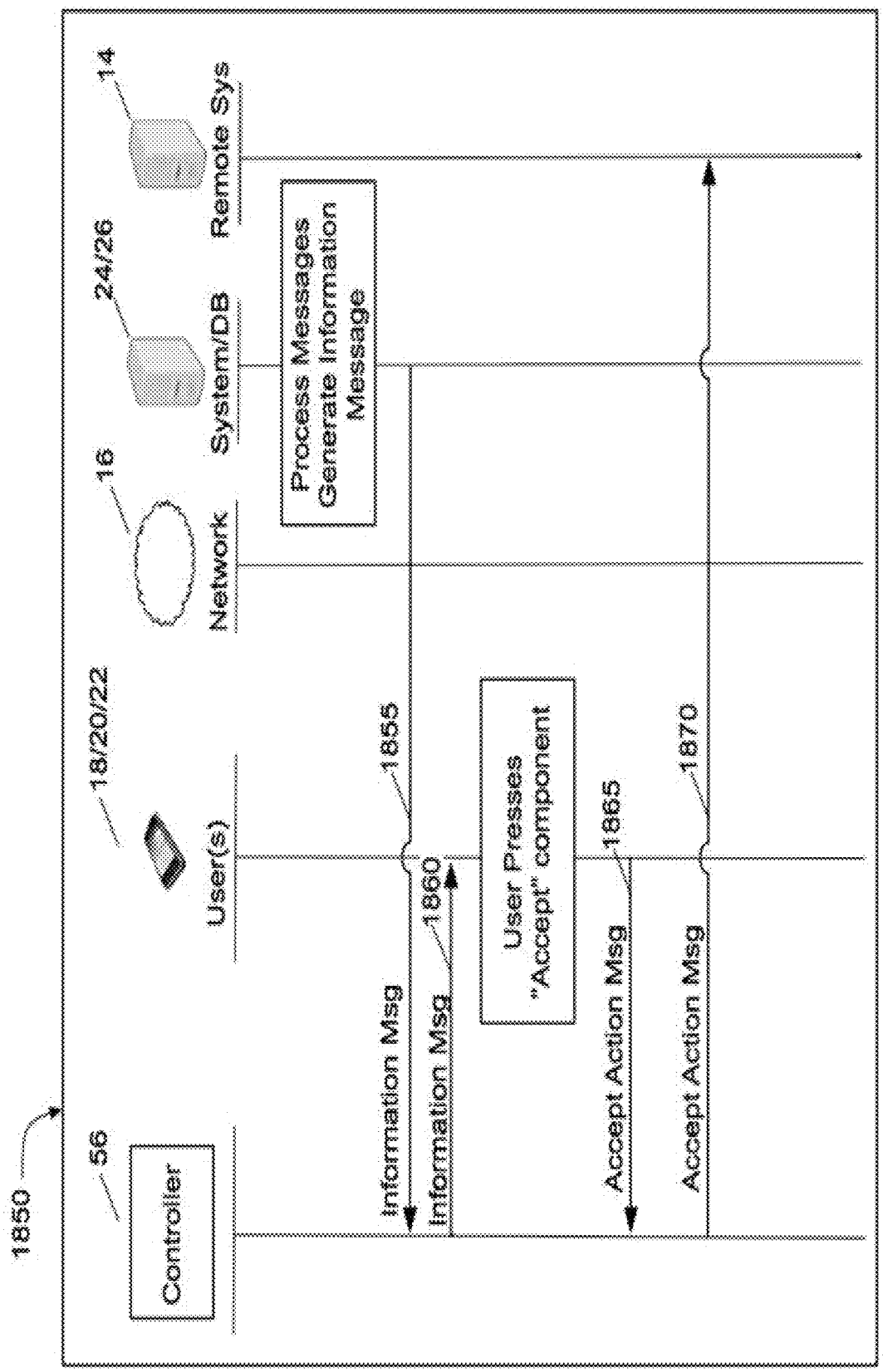
FIG. 11 illustrates still yet a further system signaling diagram according to example embodiments of the present application.
Figure 12:
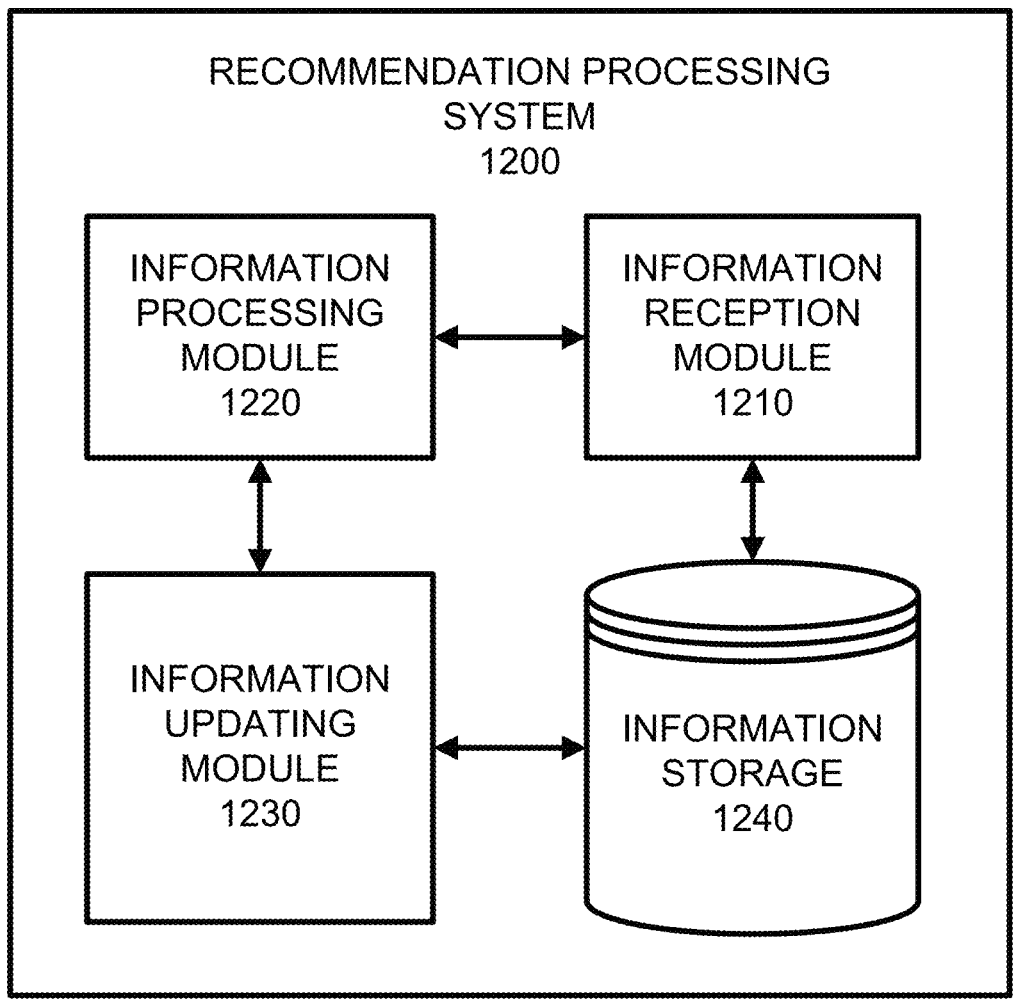
FIG. 12 illustrates a system configuration to perform one or more of the example embodiments of the present application.

FIG. 11 illustrates a further message flow of an example of one aspect of the implementation of the current application 1850. Referring to FIG. 11, the user device received one or more items in an information message as the item(s) are displayed in a list on the GUI of the display on the client device 18/20/22. The user presses at least one of the "Accept" components and an accept action message 1865 is sent to the controller 56 and routed to the remote system 14. Also, the remote system 14 is the entity that the system 24 interacted with which is considered the trusted source. The accept action message can cause the trusted source to initiate the action of the item listed on the display of the client device. For example, if the "Accept" button component of the $4^{th}$ item, as depicted above, is selected by the user: "4. Instead of a bond investment, buy ABC Gold Fund (5.4% of portfolio)" then this action causes an accept action message sent to the remote system 14 and the changes to the portfolio are initiated and changes are made to the user's portfolio.

FIG. 11 illustrates a notification or recommendation application system configuration which is to perform one or more of the example embodiments of the present application. Referring to FIG. 11, the system 1100 may be a module or device(s) that is configured to perform any of the above-noted operations. For instance, the system 1100 may include an information reception module 1110 that receives information as user data is accumulated based on identified queries, interests or other actions that cause information to be received and logged in accordance with a user account. The information processing module 1220 is responsible for retrieving the user information stored in memory 1240 and attempting to create user suggestions, notifications and perform subsequent processing operations based on the known user initiated operations. The information update module 1230 is responsible for storing in memory the user actions and changes to user information that may occur from known user actions, preferences and current interests.

One example method of operation performed by the system 1200 includes a method that includes identifying a computer hosted conversation with at least one user submitting conversational statements, parsing the conversational statements to identify at least one item of interest and retrieving at least one source of information corresponding to the at least one item of interest when the at least one source of information is identified to be valid, and then automatically creating at least one response statement that includes the at least one item of interest.

The method may also include initiating a time window with a beginning start time and an end start time responsive to identifying at least one of the conversational statements and receiving additional conversational statements from other users, and parsing the additional conversational statements. The system may then identify the at least one item of interest in the additional conversational statements, and designate the at least one item of interest as valid when the at least one item of interest is identified in the conversational statements and the additional conversational statements are received within the time window. The at least one item of interest is identified based on being part of a predetermined number of conversational statements and the additional conversational statements. Also, the system may transmit a request for information related to the at least one item of interest to at least one trusted entity data source and receive information related to the at least one item of interest responsive to the request for information and create at least one message with the information related to the at least one item of interest, and transmit the message to the user device.

Another example method of operation performed by the system 1200 may include identifying a computer hosted conversation with a plurality of users submitting conversational statements and parsing the conversational statements to identify at least one item of interest, and determining whether the at least one item of interest is a new item different from previously stored messages. Next, the system may automatically create at least one response statement message comprising third party information corresponding to the at least one item of interest, and transmit the response statement message to each of the plurality of users. The system may also perform initiating a time window with a beginning start time and an end start time responsive to identifying at least one of the conversational statements, transmitting a request for information related to the at least one item of interest to at least one trusted entity data source, and receiving a plurality of options related to the at least one item of interest. The system may also perform designating the at least one item of interest as valid when the at least one item of interest is identified in the conversational statements and is received within the time window. The at least one item of interest is identified based on being part of a predetermined number of conversational statements and the additional conversational statements. The method may also provide creating at least one message with the plurality of options related to the at least one item of interest, transmitting the message to the user device, receiving a selection of one of the plurality of options from the user device, and updating a user profile to include the selection.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 13 illustrates an example network element 1300, which may represent any of the above-described network components, etc.

Figure 13:
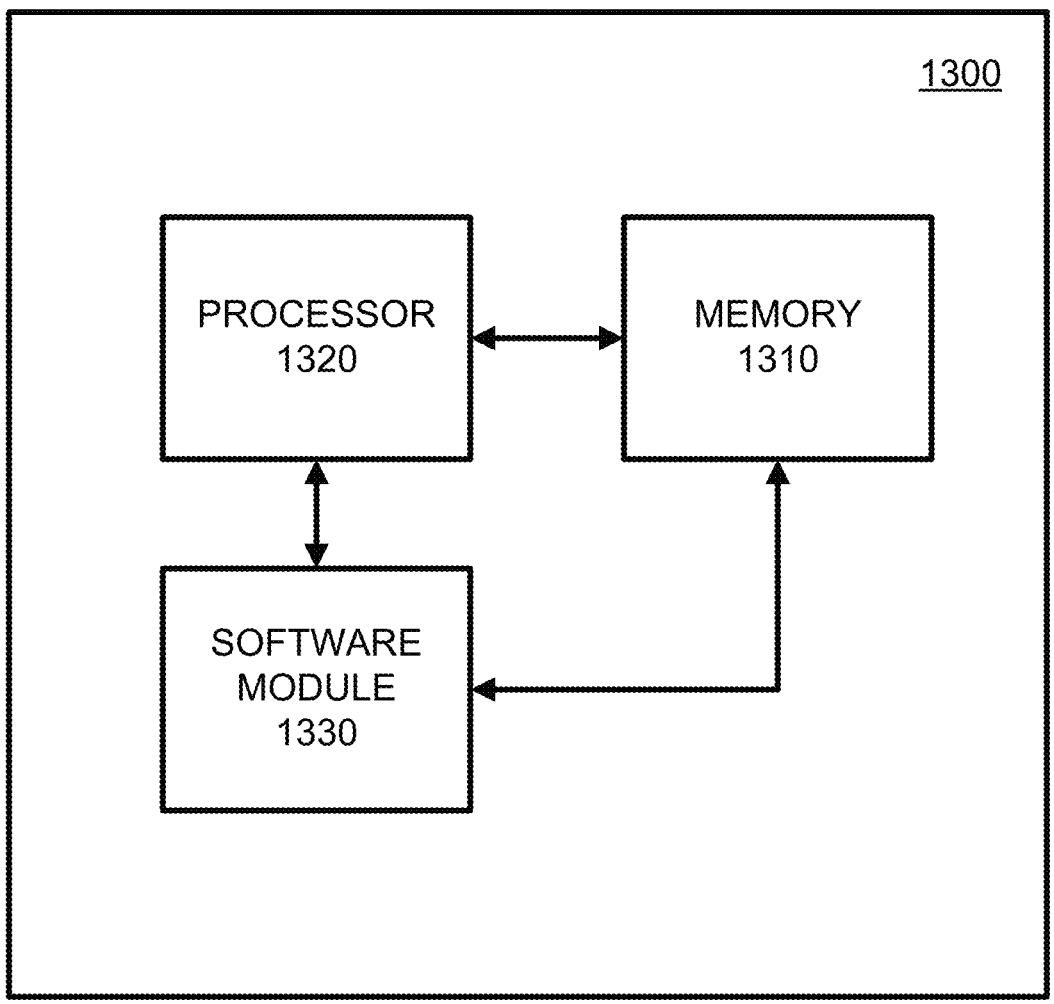
FIG. 13 illustrates an example network entity device configured to store instructions, software, and corresponding hardware for executing the same, according to example embodiments of the present application.

As illustrated in FIG. 13, a memory 1310 and a processor 1320 may be discrete components of the network entity 1300 that are used to execute an application or set of operations. The application may be coded in software in a computer language understood by the processor 1320, and stored in a computer readable medium, such as, the memory 1310. The computer readable medium may be a non-transitory computer readable medium that includes tangible hardware components in addition to software stored in memory. Furthermore, a software module 1330 may be another discrete entity that is part of the network entity 1300, and which contains software instructions that may be executed by the processor 1320. In addition to the above noted components of the network entity 1300, the network entity 1300 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 8 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the FIG.s herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   identifying a computer hosted conversation with at least one user submitting conversational statements;
   parsing the conversational statements to identify at least one item of interest;
   determining a validity of at least one source of information from a third party data source, the at least one source of information providing information corresponding to the at least one item of interest, based on a number of occurrences of the at least one item of interest in the conversational statements exceeds a threshold;
   retrieving the at least one source of information from a third party data source based the determination of validity; and
   automatically creating at least one response statement from the at least one source of information comprising the at least one item of interest to be sent to the at least one user;
   wherein the at least one item of interest is identified based on being part of a predetermined number of conversational statements and additional conversational statements from other users; and
   wherein a request for information related to the at least one item of interest is transmitted to at least one trusted entity data source.

2. The method of claim 1, further comprising:
   initiating a time window with a beginning start time and an end start time responsive to identifying at least one of the conversational statements.

3. The method of claim 2, further comprising:
   receiving additional conversational statements from other users; and
   parsing the additional conversational statements.

4. The method of claim 3, further comprising:
   identifying the at least one item of interest in the additional conversational statements; and
      designating the at least one item of interest as valid when the at least one item of interest is identified in the conversational statements and the additional conversational statements are received within the time window.

5. The method of claim 1, further comprising:
   receiving information related to the at least one item of interest responsive to the request for information;
   creating at least one message with the information related to the at least one item of interest; and
   transmitting the message to a user device.

6. An apparatus comprising:
   a processor configured to:
      identify a computer hosted conversation with at least one user submitting conversational statements,
      parse the conversational statements to identify at least one item of interest,
      determine a validity of at least one source of information from a third party data source, the at least one source of information providing information corresponding to the at least one item of interest, based on a number of occurrences of the at least one item of interest in the conversational statements exceeds a threshold; and
   a transmitter configured to transmit a retrieve request to retrieve the at least one source of information from a third party data source based the determination of validity,
   wherein the processor automatically creates, from the at least one source of information, at least one response statement comprising the at least one item of interest to be sent to the at least one user;
   wherein the at least one item of interest is identified based on being part of a predetermined number of conversational statements and additional conversational statements from other users; and
   wherein a request for information related to the at least one item of interest is transmitted to at least one trusted entity data source.

7. The apparatus of claim 6, wherein the processor is further configured to initiate a time window with a beginning start time and an end start time responsive to identifying at least one of the conversational statements.

8. The apparatus of claim 7, further comprising:
   a receiver configured to receive additional conversational statements from other users, and wherein the processor is further configured to parse the additional conversational statements.

9. The apparatus of claim 8, wherein the processor is further configured to identify the at least one item of interest in the additional conversational statements, and designate the at least one item of interest as valid when the at least one item of interest is identified in the conversational statements and the additional conversational statements are received within the time window.

10. The apparatus of claim 8, wherein the receiver is further configured to receive information related to the at least one item of interest responsive to the request for information, and the processor is further configured to create at least one message with the information related to the at least one item of interest, and the transmitter is further configured to transmit the message to a user device.

11. A non-transitory computer readable storage medium configured to store one or more instructions that when executed by a processor cause the a processor to:
   identify a computer hosted conversation with at least one user submitting conversational statements;
   parse the conversational statements to identify at least one item of interest;
   determine a validity of at least one source of information from a third party data source, the at least one source of information providing information corresponding to the at least one item of interest, based on a number of occurrences of the at least one item of interest in the conversational statements exceeds a threshold;

retrieve the at least one source of information from a third party data source based the determination of validity; and automatically create at least one response statement from the at least one source of information comprising the at least one item of interest to be sent to the at least one user;

wherein the at least one item of interest is identified based on being part of a predetermined number of conversational statements and additional conversational statements from other users; and wherein a request for information related to the at least one item of interest is transmitted to at least one trusted entity data source.

12. The non-transitory computer readable storage medium of claim 11, further configured to store one or more instructions that when executed by the processor cause the processor to:

initiate a time window with a beginning start time and an end start time responsive to identifying at least one of the conversational statements.

13. The non-transitory computer readable storage medium of claim 12, further configured to store one or more instructions that when executed by the processor cause the processor to:

receive additional conversational statements from other users; and parse the additional conversational statements.

14. The non-transitory computer readable storage medium of claim 13, further configured to store one or more instructions that when executed by the processor cause the processor to:

identify the at least one item of interest in the additional conversational statements; and designate the at least one item of interest as valid when the at least one item of interest is identified in the conversational statements and the additional conversational statements are received within the time window.

15. The non-transitory computer readable storage medium of claim 11, further configured to store one or more instructions that when executed by the processor cause the processor to:

receive information related to the at least one item of interest responsive to the request for information;

create at least one message with the information related to the at least one item of interest; and transmit the message to a user device.

* * * * *